United States Patent [19]

Kierstead et al.

[11] Patent Number: 5,419,501
[45] Date of Patent: May 30, 1995

[54] PROPELLANT GRAIN CUTTING ASSEMBLY

[75] Inventors: B. W. Kierstead, Roy; Jaren E. Weatherston, Ogden; Donald T. Bassett, Perry, all of Utah

[73] Assignee: Thiokol Corporation, Ogden, Utah

[21] Appl. No.: 153,337

[22] Filed: Nov. 15, 1993

[51] Int. Cl.$^6$ .............................................. B02C 25/00
[52] U.S. Cl. .................................... 241/36; 241/277
[58] Field of Search ............... 241/33, 36, 277, 279, 241/282.1, 282.2; 299/55, 39, 60, 79, 89, 90

[56] References Cited

U.S. PATENT DOCUMENTS

| | | | |
|---|---|---|---|
| Re. 25,470 | 11/1963 | Allimann | 299/60 X |
| 1,532,243 | 4/1925 | Hebsacker | 299/60 X |
| 1,795,109 | 3/1931 | Degenhardt et al. | 299/60 |
| 3,437,380 | 4/1969 | Lawrence | 299/60 X |
| 3,464,088 | 9/1969 | Guenter | 18/12 |
| 3,630,028 | 12/1971 | Caveny | 60/234 |
| 4,085,173 | 4/1978 | Lomax, Jr. et al. | 264/3 R |
| 4,160,314 | 7/1979 | Fridy | 29/558 |
| 4,218,941 | 8/1990 | David-Malig | 82/1 C |
| 4,462,286 | 7/1984 | Erhard | 82/1.4 |
| 4,541,757 | 9/1985 | Reynolds et al. | 407/61 |
| 4,585,600 | 4/1986 | Rollyson et al. | 264/3.3 |
| 4,598,597 | 7/1986 | Widner et al. | 73/864.41 |
| 4,633,620 | 1/1987 | Lorenzi et al. | 51/165 R |
| 4,764,319 | 8/1988 | Hightower, Jr. et al. | 264/3.4 |
| 4,793,866 | 12/1988 | McIntosh | 134/24 |
| 5,103,684 | 4/1992 | Denton | 73/864.41 |

FOREIGN PATENT DOCUMENTS 1121172 7/1968 United Kingdom .................. 299/60

*Primary Examiner*—Timothy V. Eley
*Attorney, Agent, or Firm*—Ronald L. Lyons; Madson & Metcalf

[57] ABSTRACT

A cutting assembly for cutting propellant from a rocket motor. The cutting assembly includes a plurality of first cutting wheels, second cutting wheels and secondary cutters which are mounted to a mounting head. The mounting head is attached to an arm for rotation about an axis of rotation. Means are provided for rotating the mounting head. The cutting wheels are mounted to the mounting head for rotation about an axis of rotation transverse to the axis of rotation of the mounting head. Each cutting wheel includes a plurality of cutting blades extending outwardly from the rim. The cutting blades are each configured with a radially extending cutting edge for cutting in a direction substantially normal to the axis of rotation of the mounting head. The cutting blades are oriented at an approximate 30 degree angle to the axis of rotation of the first cutting wheel, with the angle of orientation of the cutting blades of the second cutting wheels being opposite in direction to the angle of orientation of the cutting blades of the first cutting wheels. The secondary cutters include a substantially circular cutting blade for making cuts in the propellant which are substantially transverse to the cuts made by the first and second cutting wheels.

19 Claims, 5 Drawing Sheets

PROPELLANT GRAIN CUTTING ASSEMBLY

BACKGROUND

1. The Field of the Invention

The present invention is related to a device for machining solid rocket motor propellant. In particular, the present invention relates to a rotatable, circular cutting head for safely and efficiently removing the propellant from a solid rocket motor.

2. Technical Background

The disposal of solid propellant rocket motors presents a variety of problems. One of the most significant problems to be addressed when disposing of such rocket motors is how to safely and efficiently remove the propellant from the motor.

Because of its nature, any substantial amounts of energy transferred to the propellant may generate enough heat that the propellant could ignite. Current methods using single-point shaped tools are accompanied by heat generated at the cutting tip and the generation of electrostatic energy on the propellant. Thus, the use of single-point tools may be utilized only if specific precautions are taken to guard against heat build up and electrostatic energy generation.

If the propellant could be removed from the rocket motor in small, uniformly sized pieces, it could readily be recycled by using it in other applications requiring energetic materials. Alternatively, ammonium perchlorate could be extracted from the propellant through conventionally known chemical reclamation processes. However, many prior art methods for removing propellant from rocket motors do not remove the propellant in a form which easily lends itself to such further processes.

From the foregoing, it can be seen that it would be an advancement in the art to provide a system for removing solid rocket motor propellant from a rocket motor which would avoid the generation of high temperatures and minimize the build up of any electrostatic energy. It would be a further advancement in the art to provide such a system which would remove the propellant in small, uniformly sized pieces, thereby facilitating the recycling or chemical processing of the propellant.

Such a system for removing solid propellant from a rocket motor is disclosed and claimed herein.

BRIEF SUMMARY OF THE INVENTION

The present invention is directed to a novel assembly for cutting propellant from a rocket motor. The assembly includes an arm to which a mounting head is attached for rotation about an axis of rotation. The mounting head has a circular rim to which are attached a plurality of first and second cutting wheels and supplementary cutters.

The first and second cutting wheels are each mounted for rotation about an axis of rotation transverse to the axis of rotation of the mounting head. The first and second cutting wheels include a plurality of cutting blades configured with a cutting edge. The cutting blades extend radially outwardly from the axis of rotation of the cutting wheel with at least a portion of the cutting blades extending outwardly from the mounting head for making cuts in the propellant.

The cutting blades are oriented at an approximate 30 degree angle to the axis of rotation of the cutting wheels, with the angle of orientation of the cutting blades of the second cutting wheels being oriented opposite in direction to the angle of orientation of the cutting blades of the first cutting wheels. In a preferred embodiment, every other cutting blade on each cutting wheel is mounted at a first axial position with respect to the axis of rotation of the cutting wheel to which it is mounted, with the remaining cutting blades being mounted at a second axial position.

The secondary cutters are attached to the rim of the mounting head adjacent each second cutting wheel. The secondary cutters include a substantially circular cutting blade which extends outwardly from the mounting head for making cuts in the propellant which are substantially transverse to the cuts made by the first and second cutting wheels. The secondary cutters are positioned such that the cutting blades of the first and second cutting wheels extend radially outwardly from the axis of rotation of the mounting head at least as far as the curved cutting blade of the secondary cutters.

In a presently preferred embodiment, the cutting assembly includes four first cutting wheels, four second cutting wheels and four secondary cutters. An eddy current sensor is attached to the mounting head to detect the presence of any metal objects which may be embedded in the propellant. Means, such as a motor and drive assembly, are also provided for rotating the mounting head about its axis of rotation.

DETAILED DESCRIPTION OF THE PREFERRED EMBODIMENTS

Figure 1:
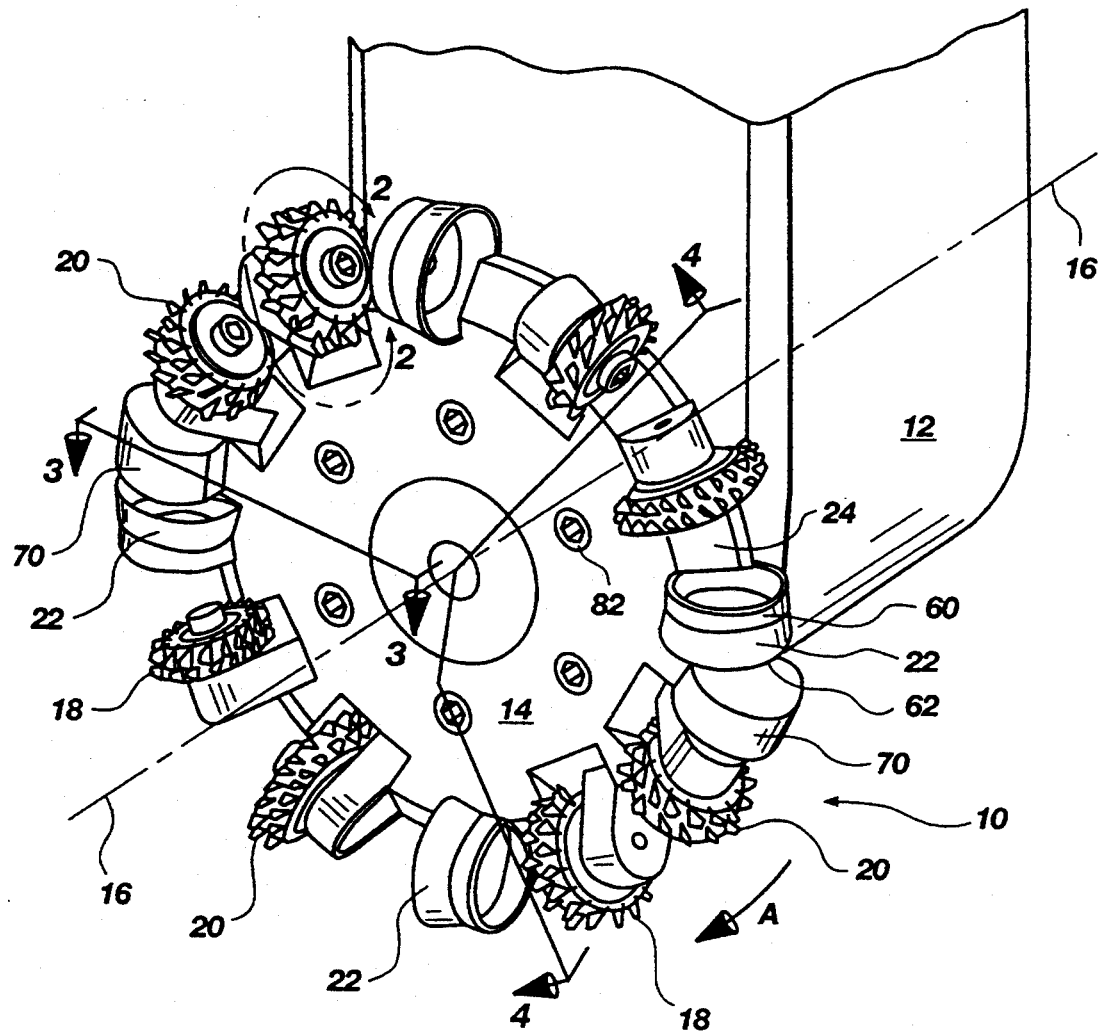
FIG. 1 is a perspective view of the mounting head of one preferred embodiment of the present invention.
Figure 2:
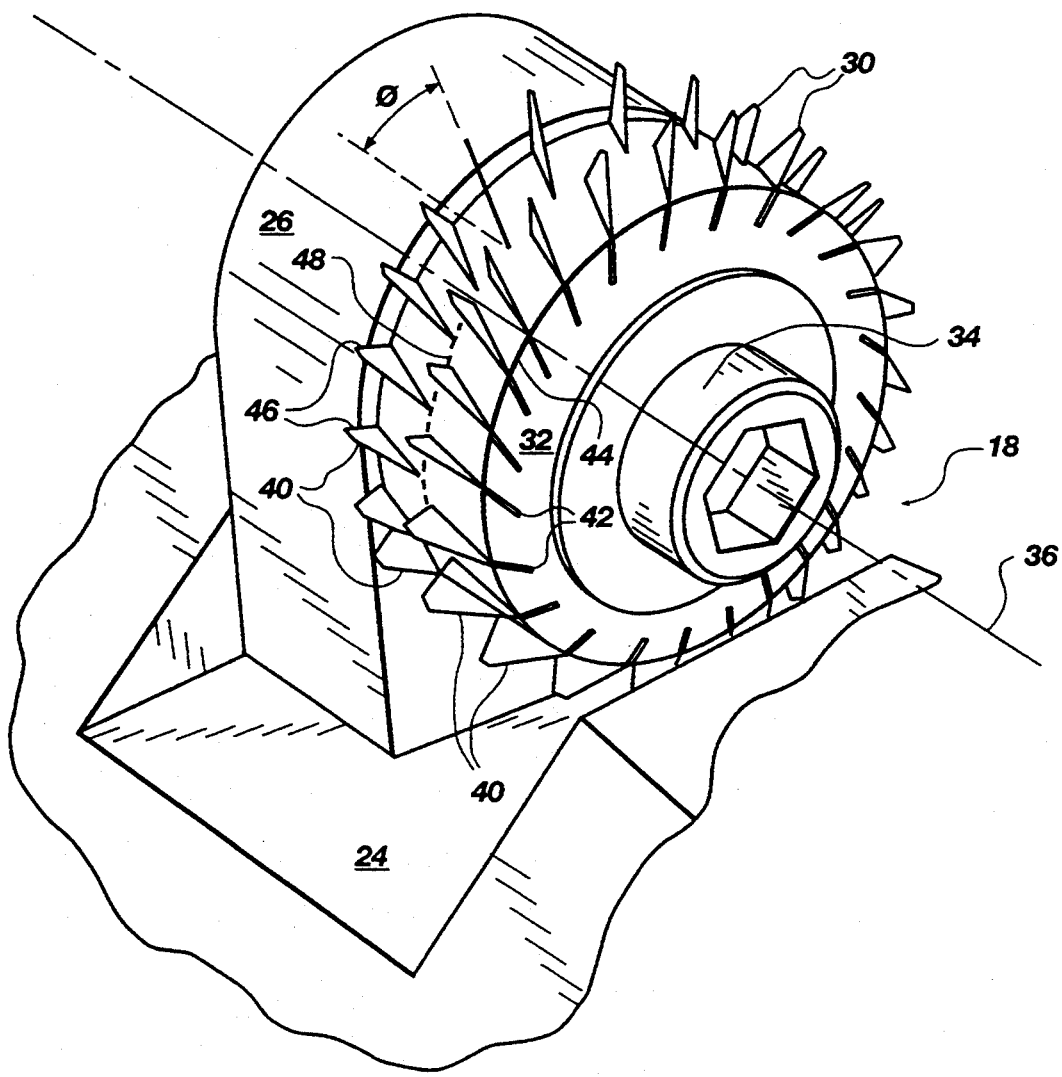
FIG. 2 is a perspective view of one preferred embodiment of one cutting wheel employed by the cutting assembly of the present invention.
Figure 3:
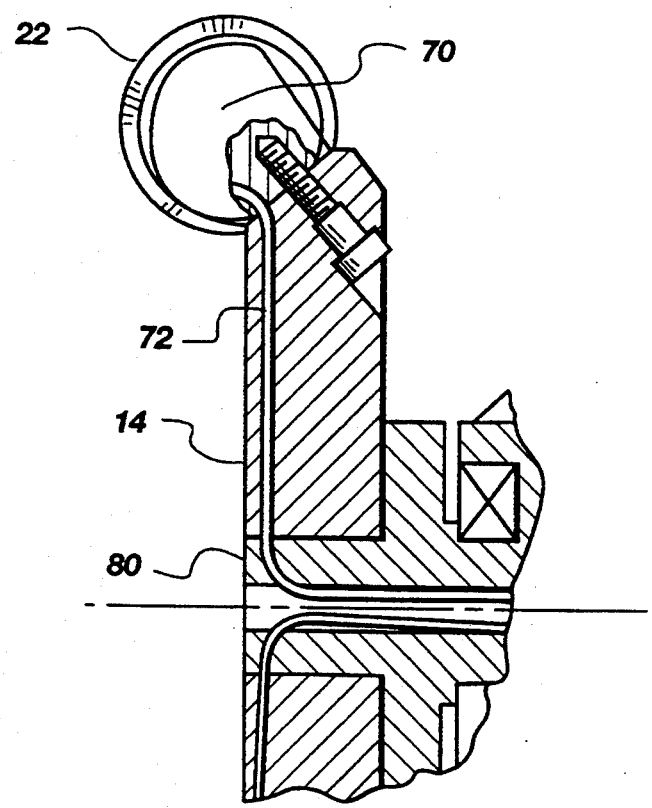
FIG. 3 is a cross-sectional view taken along line 3—3 of FIG. 1.
Figure 4:
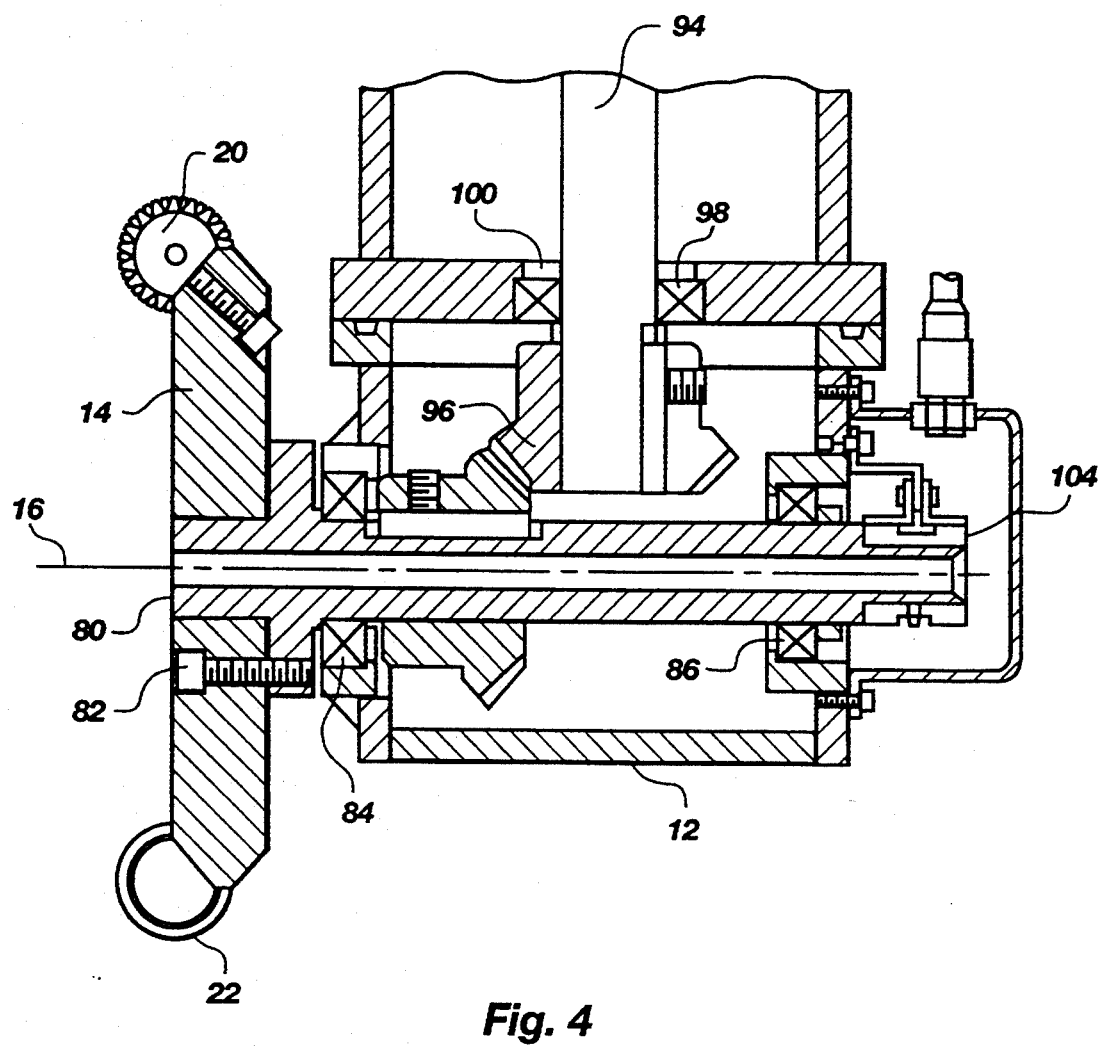
FIG. 4 is a cross-sectional view taken along line 4—4 of FIG. 1.
Figure 5:
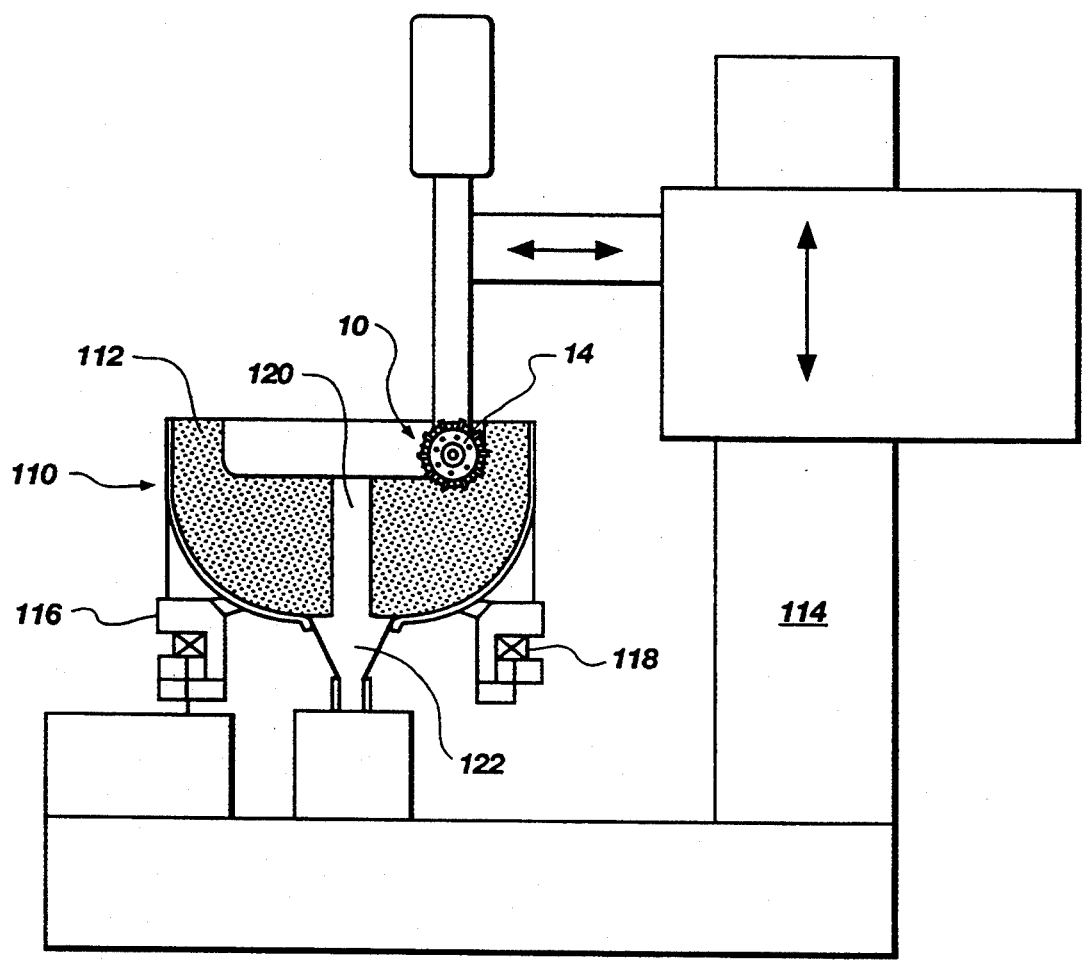
FIG. 5 is a side, plan view of one embodiment of the present invention being used to remove propellant from a rocket motor.

Reference is now made to the figures wherein like parts are referred to by like numerals throughout. With particular reference to FIG. 1, one embodiment of a cutting assembly for cutting solid rocket motor propellant, built in accordance with the present invention, is generally designated at 10. The cutting assembly includes an arm 12 and a mounting head 14 mounted to the arm 12 for rotation about an axis of rotation 16 in a cutting direction indicated by arrow A.

The cutting assembly 10 further includes a variety of cutters, including a plurality of first cutting wheels 18, a plurality of second cutting wheels 20 and a plurality of secondary cutters 22. In this preferred embodiment, the first cutting wheels 18, the second cutting wheels 20 and the secondary cutters 22 all have a diameter of approximately five centimeters. The first cutting wheels 18, the second cutting wheels 20 and the secondary cutters 22 are mounted to a rim 24 of the mounting head 14.

As will be explained in further detail below, it is presently preferred to position the cutters in series, with one first cutting wheel 18, one second cutting wheel 20 and one secondary cutter 22 in each series. In this presently preferred embodiment of the invention, four such series of cutters are utilized. Thus, each second cutting Further rotation of the mounting head 14 then brings the secondary cutter 22 into engagement with the propellant. Because the cutting blades of the first and second cutting wheels 18 and 20 extend radially outwardly from the axis of rotation 16 of the mounting head 14 at least as far as the curved cutting blade of the secondary cutter 22, the secondary cutter 22 cuts the propellant away from the rocket motor. Hence, when the secondary cutter 22 cuts off the propellant, rather than cut away a continuous ribbon of propellant, the propellant is removed in a plurality of diamond-shaped chips. By cutting the propellant into small chips, any electrostatic energy generated during the cutting process will not build up in the propellant, as may occur when cutting long ribbons of propellant.

The propellant chips are then removed from the rocket motor by gravity feed through the rocket motor port 120 and into a funnel 122. The chips may then be reclaimed and used in other applications.

A cooling mechanism, such as an air or mist cooling device, is preferably utilized to prevent the temperature of the cutting blades from approaching the auto-ignition temperature of the propellant. The use of misting also assists in settling any dust generated during the cutting procedure and in reducing the amount of electrostatic energy in the dust.

The angular orientation of the cutting blades on the first and second cutting wheels 18 and 20 causes the cutting wheels to rotate as they cut. Thus, when cutting propellant, the cutting blades on the cutting wheels are not continuously cutting propellant. Consequently, heating of the cutting blades due to friction while cutting is minimized. Also, the use of four series of cutters assists in keeping the temperature of the cutting blades within acceptable levels.

The rate of feed of the cutting assembly is thus dictated by the heat dissipation ability of the cutting assembly. In this presently preferred embodiment, in which a mist cooling device is utilized to cool the cutting blades, a feed rate of approximately 0.6 meters per second is preferred, with the mounting wheel 14 rotating at a rate of 25 revolutions per minute.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by patent is:

1. A cutting assembly for cutting propellant from a rocket motor, comprising:
    an arm;
    a mounting head attached to the arm for rotation about an axis of rotation, the mounting head having a rim;
    a plurality of first cutting wheels attached to the rim of the mounting head, each first cutting wheel including a plurality of cutting blades each with a cutting edge, at least a portion of each cutting blade extending outwardly from the mounting head for making cuts in the propellant;
    a plurality of secondary cutters attached to the rim of the mounting head, each secondary cutter including a cutting edge extending outwardly from the mounting head for making cuts in the propellant which are substantially transverse to the cuts made by the first cutting wheels; and
    means for rotating the mounting head about its axis of rotation.

2. A cutting assembly as defined in claim 1, wherein each of the first cutting wheels is mounted for rotation about an axis of rotation transverse to the axis of rotation of the mounting head.

3. A cutting assembly as defined in claim 2, wherein the cutting blades of each first cutting wheel are oriented at an acute angle to the axis of rotation of the first cutting wheel.

4. A cutting assembly as defined in claim 3, further comprising a plurality of second cutting wheels attached to the rim of the mounting head, each second cutting wheel mounted for rotation about an axis of rotation transverse to the axis of rotation of the mounting head, each second cutting wheel including a plurality of cutting blades each configured with a cutting edge, at least a portion of each cutting blade extending outwardly from the mounting head for making cuts in the propellant, the cutting blades of each second cutting wheel oriented at an acute angle to the axis of rotation of the second cutting wheel, the acute angle of orientation of the cutting blades of the second cutting wheels being opposite in direction to the acute angle of orientation of the cutting blades of the first cutting wheels.

5. A cutting assembly as defined in claim 1, wherein each first cutting wheel is positioned adjacent to a secondary cutter.

6. A cutting assembly as defined in claim 1, wherein each secondary cutter includes a curved cutting blade.

7. A cutting assembly as defined in claim 1, wherein the cutting blades of the first and second cutting wheels are configured to extend radially outwardly from the axis of rotation of the mounting head at least as far as the curved cutting blade of the secondary cutters extend radially outwardly from the axis of rotation of the mounting head.

8. A cutting assembly as defined in claim 1, wherein the rim of the mounting head is circular.

9. A cutting assembly for cutting propellant from a rocket motor, comprising:
    an arm;
    a mounting head attached to the arm for rotation about an axis of rotation, the mounting head having a circular rim;
    a plurality of first cutting wheels attached to the rim of the mounting head, each first cutting wheel mounted for rotation about an axis of rotation transverse to the axis of rotation of the mounting head, each first cutting wheel including a plurality of cutting blades each configured with a cutting edge, the cutting blades extending radially outwardly from the axis of rotation of the first cutting wheel, at least a portion of each cutting blade extending outwardly from the mounting head for making cuts in the propellant, the cutting blades of each first cutting wheel oriented at an acute angle to the axis of rotation of the first cutting wheel;
    a plurality of second cutting wheels attached to the rim of the mounting head, each second cutting wheel mounted for rotation about an axis of rotation transverse to the axis of rotation of the mounting head, each second cutting wheel including a plurality of cutting blades each configured with a cutting edge, the cutting blades extending radially outwardly from the axis of rotation of the second cutting wheel, at least a portion of each cutting blade extending outwardly from the mounting head for making cuts in the propellant, the cutting blades of each second cutting wheel oriented at an acute angle to the axis of rotation of the second cutting wheel, the acute angle of orientation of the cutting blades of the second cutting wheels being opposite in direction to the acute angle of orientation of the cutting blades of the first cutting wheels;

a plurality of secondary cutters attached to the rim of the mounting head, each secondary cutter including a curved cutting blade extending outwardly from the mounting head for making cuts in the propellant which are substantially transverse to the cuts made by the first and second cutting wheels;

the cutting blades of the first and second cutting wheels configured to extend radially outwardly from the axis of rotation of the mounting head at least as far as the curved cutting blade of the secondary cutters extend radially outwardly from the axis of rotation of the mounting head; and means for rotating the mounting head about its axis of rotation in a cutting direction.

10. A cutting assembly as defined in claim 9, wherein the cutting assembly includes an equal number of first cutting wheels, second cutting wheels and secondary cutters.

11. A cutting assembly as defined in claim 10, wherein each second cutting wheel is positioned between a first cutting wheel and a secondary cutter.

12. A cutting assembly as defined in claim 11, wherein the cutting assembly includes four first cutting wheels, four second cutting wheels and four secondary cutters.

13. A cutting assembly as defined in claim 9, wherein the angle of orientation of the cutting blades of the first and second cutting wheels is approximately 30 degrees.

14. A cutting assembly as defined in claim 9, wherein the curved cutting blade of the secondary cutters is substantially circular.

15. A cutting assembly as defined in claim 9, wherein every other cutting blade of each first cutting wheel is mounted at a first axial position with respect to the axis of rotation of the first cutting wheel to which the cutting blades are mounted and the remaining cutting blades of the first cutting wheel are mounted at a second axial position with respect to the axis of rotation of the first cutting wheel to which the cutting blades are mounted and wherein every other cutting blade of each second cutting wheel is mounted at a first axial position with respect to the axis of rotation of the second cutting wheel to which the cutting blades are mounted and the remaining cutting blades of the second cutting wheel are mounted at a second axial position with respect to the axis of rotation of the second cutting wheel to which the cutting blades are mounted.

16. A cutting assembly as defined in claim 9, further comprising an eddy current sensor attached to the mounting head.

17. A cutting assembly for cutting propellant from a rocket motor, comprising:

an arm;

a mounting head attached to the arm for rotation about an axis of rotation, the mounting head having a circular rim;

a plurality of first cutting wheels attached to the rim of the mounting head, each first cutting wheel mounted for rotation about an axis of rotation transverse to the axis of rotation of the mounting head, each first cutting wheel including a plurality of cutting blades each configured with a cutting edge, the cutting blades extending radially outwardly from the axis of rotation of the first cutting wheel, at least a portion of each cutting blade extending outwardly from the mounting head for making cuts in the propellant, the cutting blades of each first cutting wheel oriented at an approximate 30 degree angle to the axis of rotation to the first cutting wheel;

a second cutting wheel attached to the rim of the mounting head adjacent each of the first cutting wheels, each second cutting wheel mounted for rotation about an axis of rotation transverse to the axis of rotation of the mounting head, each second cutting wheel including a plurality of cutting blades each configured with a cutting edge, the cutting blades extending radially outwardly from the axis of rotation of the second cutting wheel, at least, a portion of each cutting blade extending outwardly from the mounting head for making cuts in the propellant, the cutting blades of each second cutting wheel oriented at an approximate 30 degree angle to the axis of rotation of the second cutting wheel, the angle of orientation of the cutting blades of the second cutting wheels being opposite in direction to the angle of orientation of the cutting blades of the first cutting wheels;

a secondary cutter attached to the rim of the mounting head adjacent each second cutting wheel, each secondary cutter including a substantially circular cutting blade extending outwardly from the mounting head for making cuts in the propellant which are substantially transverse to the cuts made by the first and second cutting wheels;

the cutting blades of the first and second cutting wheels configured to extend radially outwardly from the axis of rotation of the mounting head at least as far as the curved cutting blade of the secondary cutters extend radially outwardly from the axis of rotation of the mounting head;

an eddy current sensor attached to the mounting head; and means for rotating the mounting head about its axis of rotation in a cutting direction.

18. A cutting assembly as defined in claim 17, wherein the cutting assembly includes four first cutting wheels, four second cutting wheels and four secondary cutters.

19. A cutting assembly as defined in claim 17, wherein every other cutting blade of each first cutting wheel is mounted at a first axial position with respect to the axis of rotation of the first cutting wheel to which the cutting blades are mounted and the remaining cutting blades of the first cutting wheel are mounted at a second axial position with respect to the axis of rotation of the first cutting wheel to which the cutting blades are mounted and wherein every other cutting blade of each second cutting wheel is mounted at a first axial position with respect to the axis of rotation of the second cutting wheel to which the cutting blades are mounted and the remaining cutting blades of the second cutting wheel are mounted at a second axial position with respect to the axis of rotation of the second cutting wheel to which the cutting blades are mounted.

* * * * *